United States Patent
Badarneh

(10) Patent No.: US 7,297,882 B2
(45) Date of Patent: Nov. 20, 2007

(54) MULTIFUNCTIONAL SWITCH DEVICE

(75) Inventor: Ziad Badarneh, Oslo (NO)

(73) Assignee: Telenostra AS (NO)

( * ) Notice: Subject to any disclaimer, the term of this patent is extended or adjusted under 35 U.S.C. 154(b) by 199 days.

(21) Appl. No.: 10/542,651

(22) PCT Filed: Jan. 20, 2004

(86) PCT No.: PCT/NO2004/000012

§ 371 (c)(1),
(2), (4) Date: Jul. 19, 2005

(87) PCT Pub. No.: WO2004/068522

PCT Pub. Date: Aug. 12, 2004

(65) Prior Publication Data

US 2006/0243568 A1    Nov. 2, 2006

(30) Foreign Application Priority Data

Jan. 20, 2003   (NO) ................................. 20030310
Sep. 19, 2003   (NO) ................................. 20034167

(51) Int. Cl.
*H01H 25/04* (2006.01)
(52) U.S. Cl. ..................... 200/5 R; 200/6 A
(58) Field of Classification Search ................. 200/4,
200/5 R, 6 A, 17 R, 18, 14, 329; 341/20,
341/22, 35; 345/156, 157, 160, 161, 168,
345/169, 184

See application file for complete search history.

(56) References Cited

U.S. PATENT DOCUMENTS

| 4,103,132 | A  |   | 7/1978  | Schwarzkopf |
|-----------|----|---|---------|-------------|
| 5,047,596 | A  |   | 9/1991  | Ebishi |
| 6,084,189 | A  |   | 7/2000  | Menche et al. |
| 6,225,579 | B1 |   | 5/2001  | Ritter et al. |
| 6,396,006 | B1 | * | 5/2002  | Yokoji et al. ................... 200/4 |
| 6,525,280 | B2 |   | 2/2003  | Cui |
| 6,720,504 | B2 | * | 4/2004  | Nishimoto et al. ............ 200/4 |
| 6,784,384 | B2 | * | 8/2004  | Park et al. ................ 200/11 R |
| 6,953,900 | B2 | * | 10/2005 | Sottong ...................... 200/5 R |
| 7,087,848 | B1 | * | 8/2006  | Yamasaki et al. ........... 200/6 A |
| 7,091,430 | B1 | * | 8/2006  | Haizima et al. ............ 200/6 A |
| 7,119,290 | B2 | * | 10/2006 | Kim ........................... 200/5 R |
| 7,193,166 | B2 | * | 3/2007  | Sakurai ...................... 200/5 R |

FOREIGN PATENT DOCUMENTS

EP    1182678 A1    2/2002

* cited by examiner

*Primary Examiner*—Michael A Friedhofer
(74) *Attorney, Agent, or Firm*—Rodman & Rodman

(57) ABSTRACT

A multifunctional switch device with rotation, tilt and/or press functions, intended for use in electronic equipment such as computers, handheld electronic apparatus and/or devices which are associated with use in means of transport such as vehicles, boats and aircraft, said equipment having or being connected to a display for function control, wherein the switch device contains a tilting device that has a cardan movement for actuating underlying contact points.

17 Claims, 11 Drawing Sheets

MULTIFUNCTIONAL SWITCH DEVICE

The present invention relates to a tilting device and a tilt function for multifunctional switches, especially developed for use in electronic equipment and in handheld apparatus and for vehicles and means of transport.

Handheld electronic equipment is constantly being endowed with more functions and areas of application. In vehicles, new functions that are to be operated by the driver are constantly being introduced. It has been found that the conventional keypads are not particularly user friendly in connection with small apparatus and for use in conjunction with driving a car or similar situations.

The Inventor has previously described several types of multifunctional switches which together with an adapted graphical user interface can replace or complement conventional keypads. In other words, it is intended that the switch should be able to function interactively with a menu system shown on a display screen, for example an LCD screen. However, one of the objects is that the information displayed on the screen should be easy for the user to understand, depending upon the physical design of the switch device. The Applicant's earlier applications which form the basis for the invention include the following: WO 0034965, WO 0141402, WO 0161637, PCT/NO02/00231 and PCT/NO02/00309.

The multifunctional switches previously described by the Inventor have a rotation and/or sliding function and at least three press or tilt functions. These are arranged in direct connection with the operating element of the switch and make the whole construction compact and versatile. The systems described exhibit different solutions for tilt or press functions. These solutions involve primarily the use of several parts which interact to create the press and tilt effect that is required.

The object of the present invention is to obtain a construction which uses fewer parts, has a long wear life and yields production and production-economic advantages.

The invention relates in particular to an embodiment of a tilt function for a switch having four tilt or press functions and a centre press. The embodiment will therefore be suitable for use in switches having rotation or sliding functions. However, other types of multifunctional switches are also conceivable.

The characteristic features of the invention are set forth in attached independent claims 1 and 8 and the respective dependent patent claims associated therewith, and in following description with reference to the attached drawings.

The following figures will describe the invention and in particular in connection with a rotatable multifunctional switch. However, the solution or technology illustrated and described herein is easily transferable to many of the multifunctional switches described in, inter alia, in the Inventor's previously mentioned applications, in order to simplify and improve these earlier solutions.

Any person skilled in the art will see that the solutions can be used in switches and operating controls in connection with many forms of electronic equipment.

FIGS. 1a-b are views of a tilting part.

FIGS. 8a-d show a typical design of the touch part of the operating element.

Figure 5:
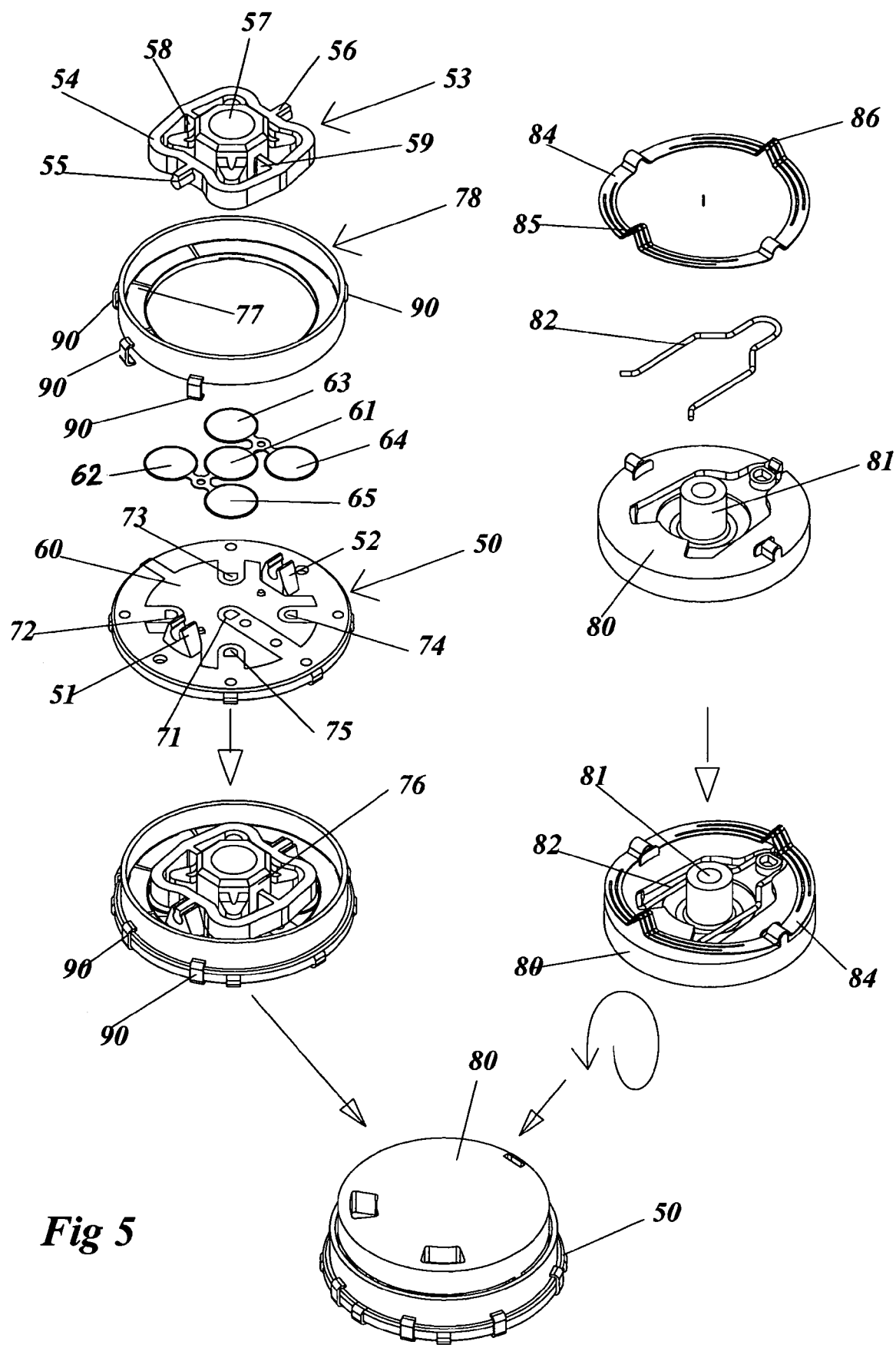
FIG. 5 shows the individual parts of which the switch is comprised.
Figure 9:
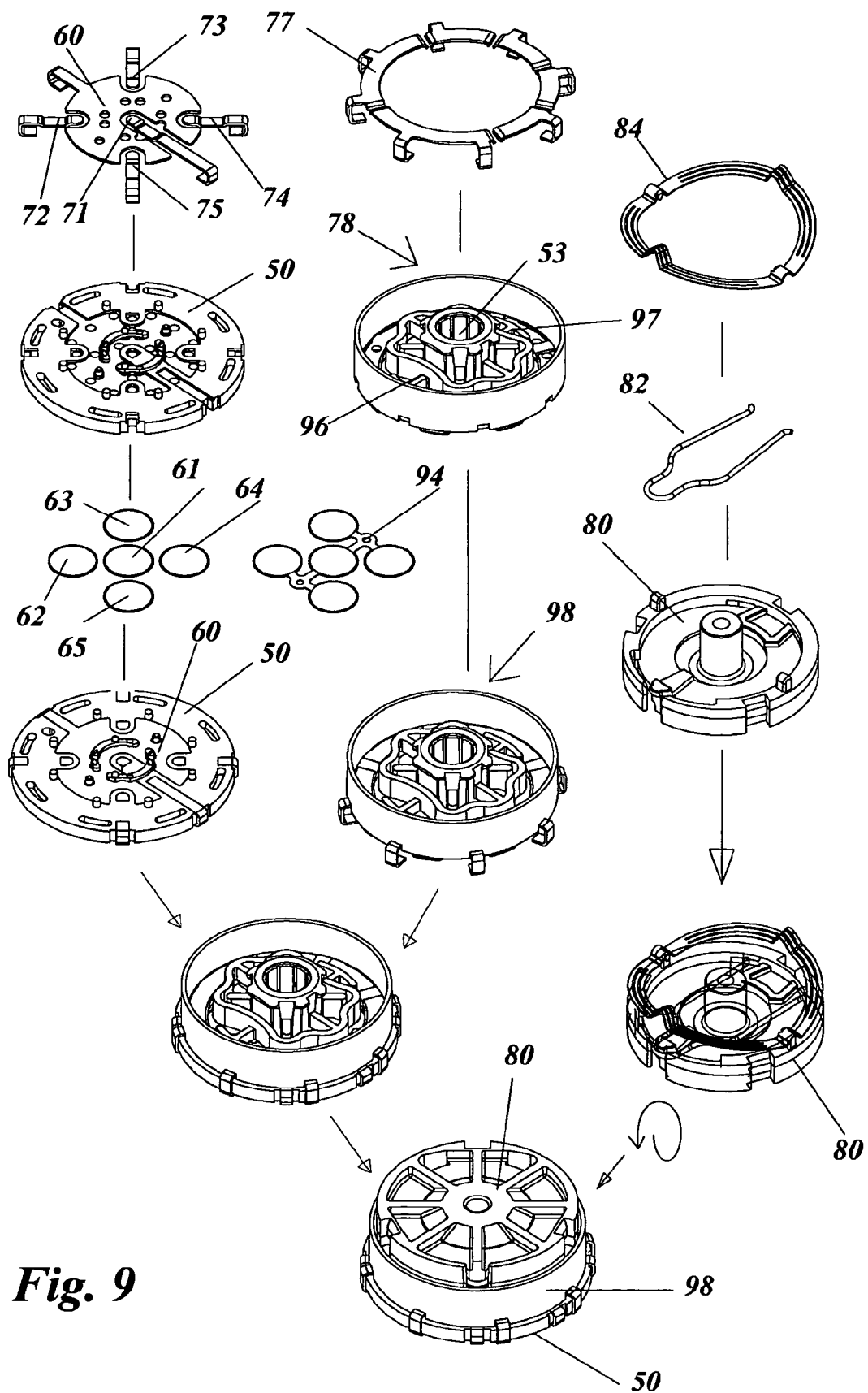

FIG. 9 shows a variant of the switch in FIG. 5.

The invention will now be described in more detail with reference to the figures and also in conjunction with the attached patent claims.

Figure 1A:
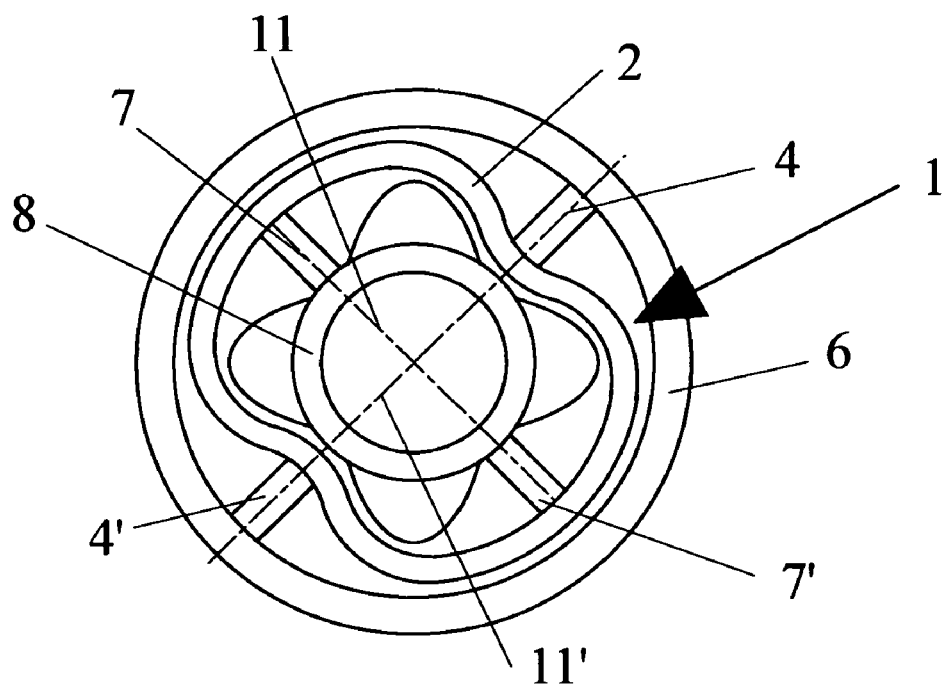
Figure 1B:
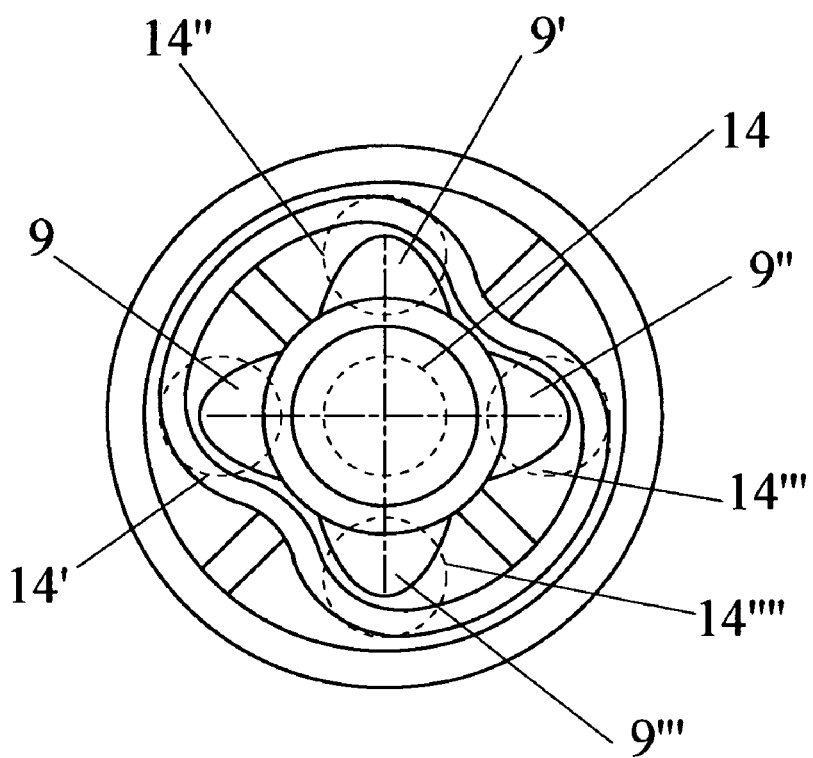

The multifunctional switches with tilt functions that are described in the Applicant's earlier applications are largely based on interaction between several movable parts. The present invention teaches a multifunctional switch which obtains a tilt and press function by using a flexible tilting device which may be termed a cardan unit. The cardan unit 1 employs a principle known from a cardan or a flexible rod. As shown in FIG. 1, the cardan unit 1 consists of various "parts". However, these are fixedly connected to each other. This means that in production the cardan unit 1 can be moulded as a single part. The cardan unit 1 consists of an outer ring 2 which is fixedly attached via two "shafts" 4 and 4' to frame part 6. In this case, the frame part 6 is a housing for the switch which provides the basis for the description of the invention in this application. A cross member 8 is fixed to the ring 2 via two "shafts" 7 and 7'. The cross member has four projections 9-9''' about an annular centre part. The shafts 4-4' and 7-7' are non-rotatable, but are fixedly connected at both ends. Thus, this is a modified cardan coupling because in general a cardan coupling has rotatable bearings, whilst this solution employs self-returning cardan elements 2 and 8 due to torsional forces which return the elements to a neutral position. The whole cardan unit 1 could be made of a flexible material, for example, of various types of plastic or types of hard rubber. The shafts will nevertheless be of such shape and thickness that the material here will yield to applied force and cause torsion which will actuate an underlying contact point as indicated by 14'-14''''.

Figure 2A:
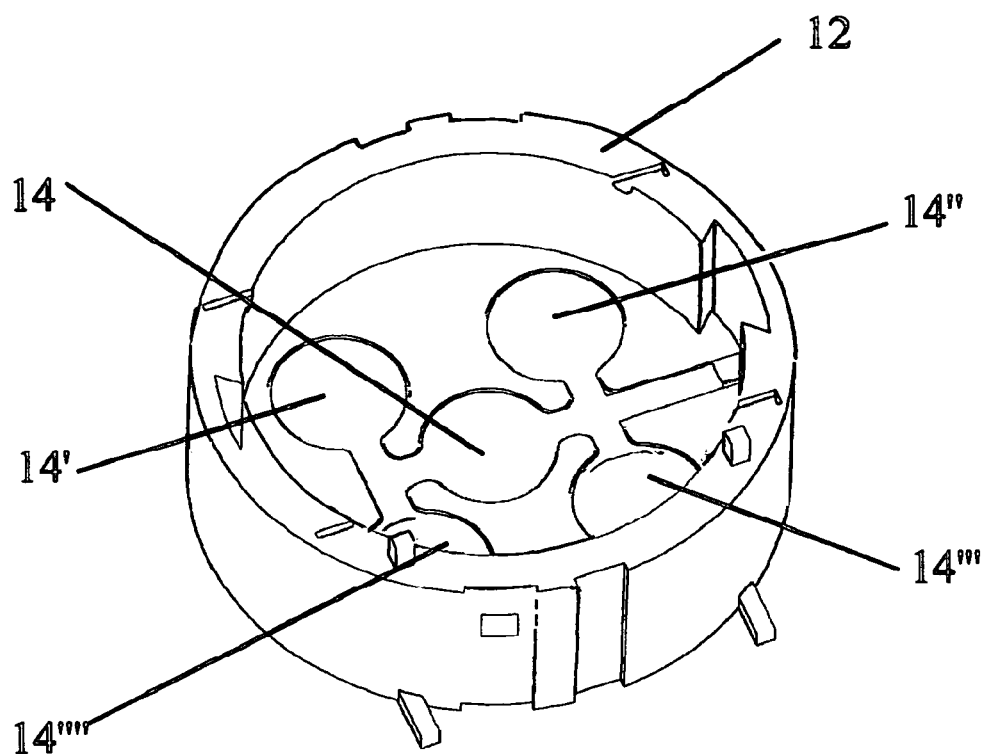
FIGS. 2a-2d show the tilting part in a multifunctional switch with rotation.
Figure 2B:
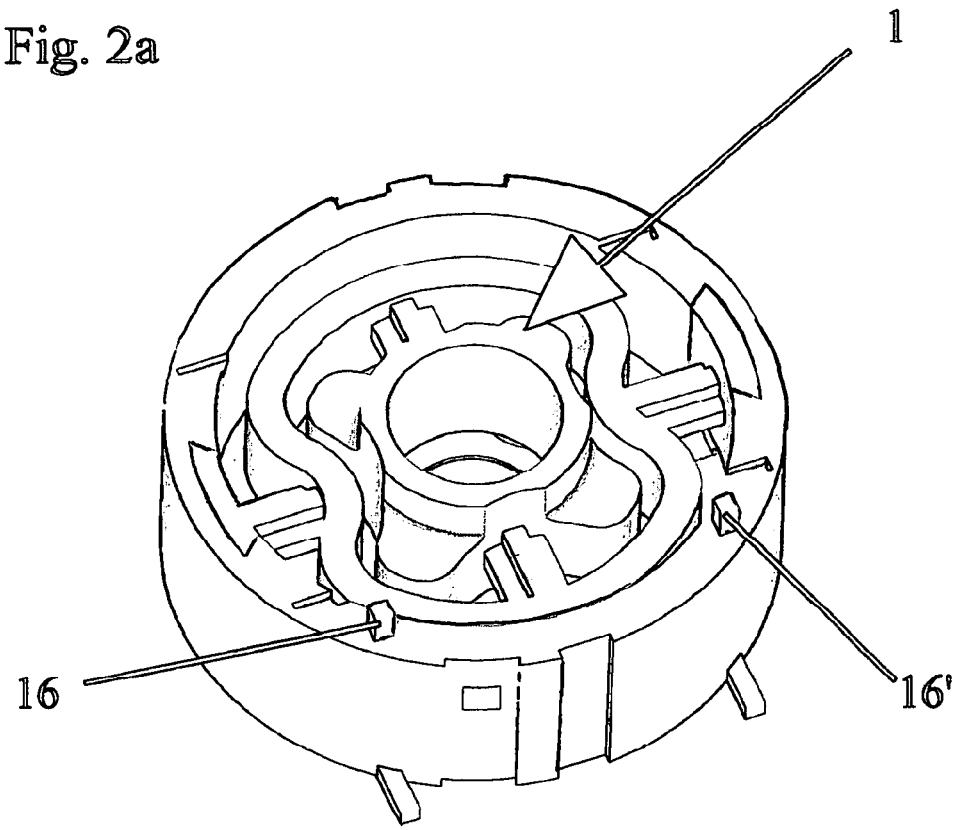

The cardan unit 1 can be moulded in one piece independent of the frame, as indicated in FIG. 2b, or as a piece of the frame as shown in FIG. 3.

It should also be pointed out here that the cardan unit may be in two parts, where the ring 2 is movable relative to the cross member 8 in a known way in that the shafts are rotatable about centre lines 11-11'. However, this would be a more conventional method which would not obtain the advantages that a one-piece, flexible solution would.

The following description will show a complete solution for a rotatable multifunctional switch with a central press function and four tilt functions.

FIG. 2a shows a frame 12 which has in the bottom spring-loaded contact points 14-14''''.

FIG. 2b shows a fitted tilting part 1 as described in connection with FIG. 1. The reference numerals 16-16' indicate contact points for detection of the rotation function.

Figure 2C:
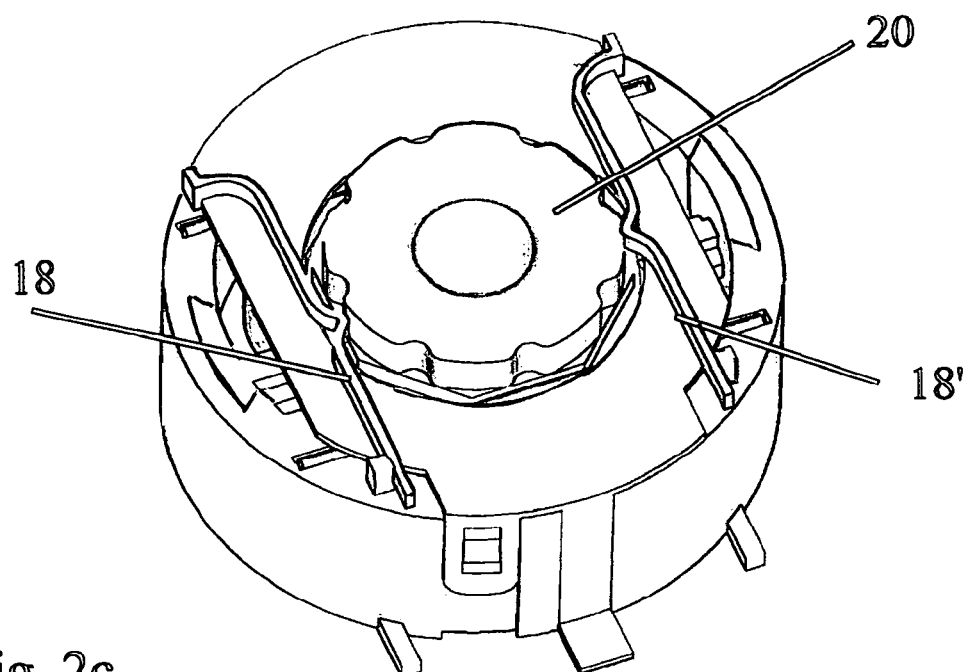

FIG. 2c shows two contact springs 18 and 18' which act against the contact points 14-14' when the centre part 20 is rotated, thereby registering the movement thereof.

Figure 2D:
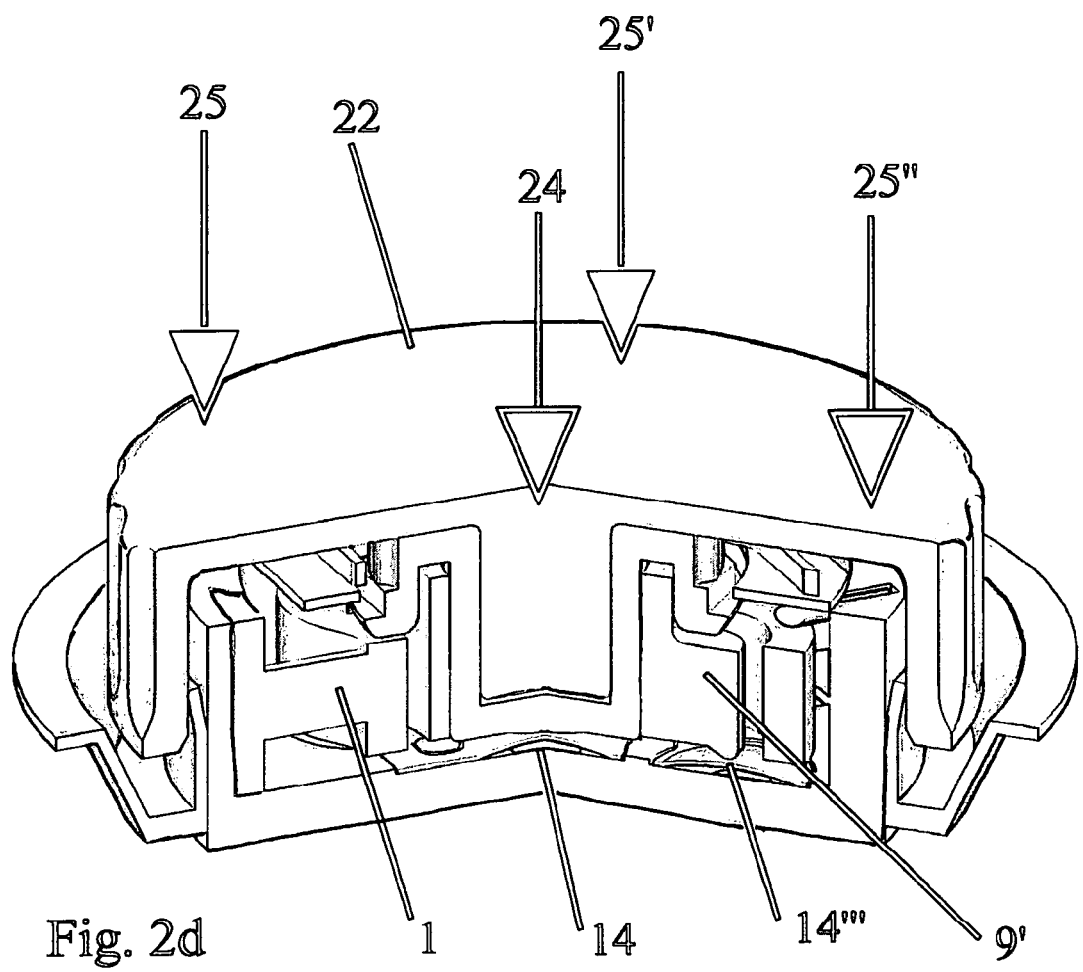
Figure 3A:
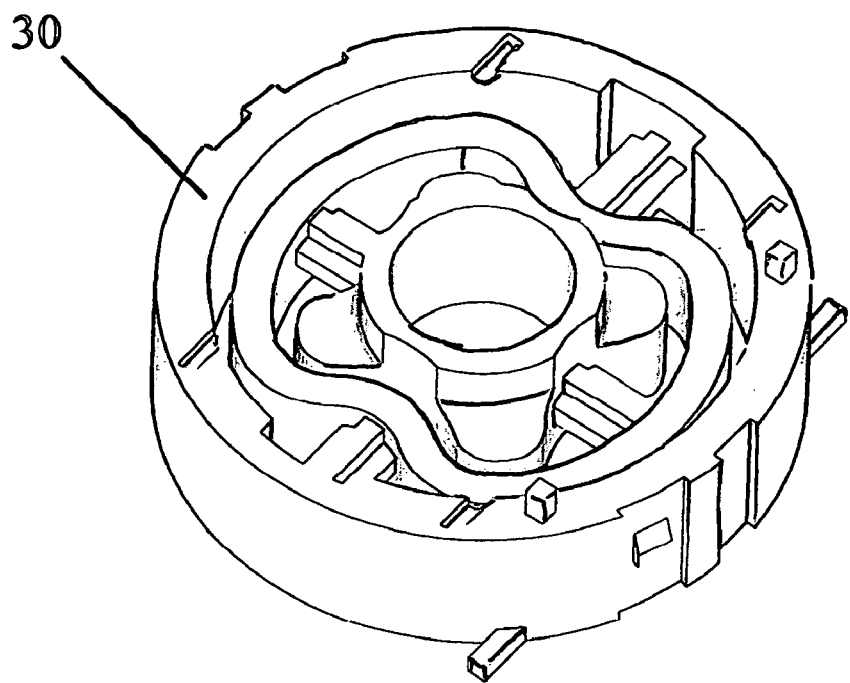
FIGS. 3a-3d show a variant of the rotary multifunctional switch equipped with the tilting part.
Figure 3B:
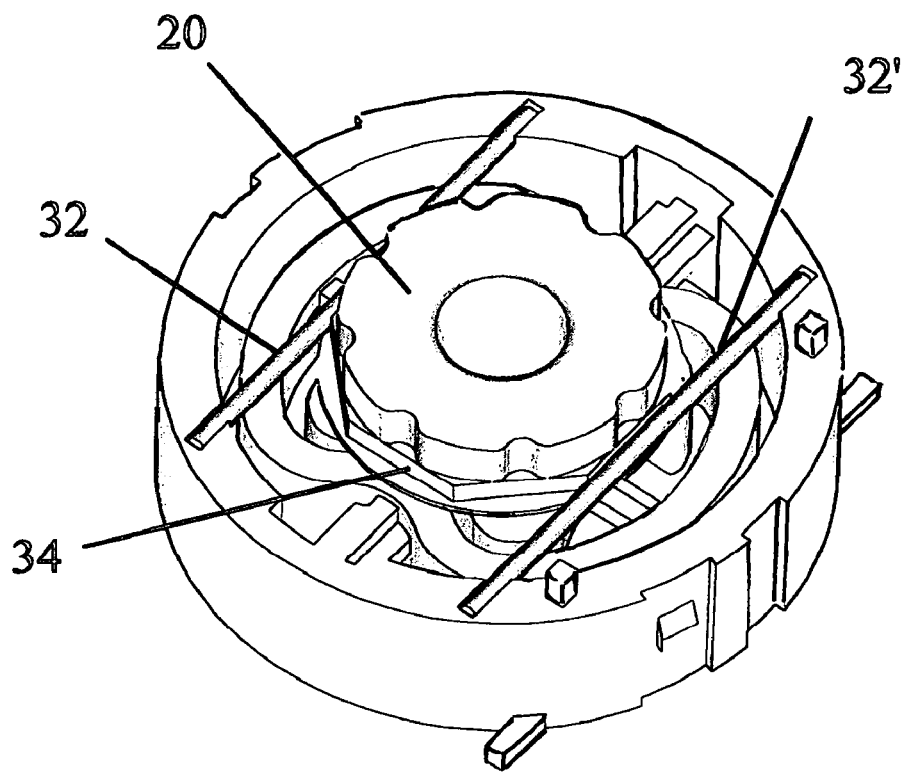
Figure 3C:
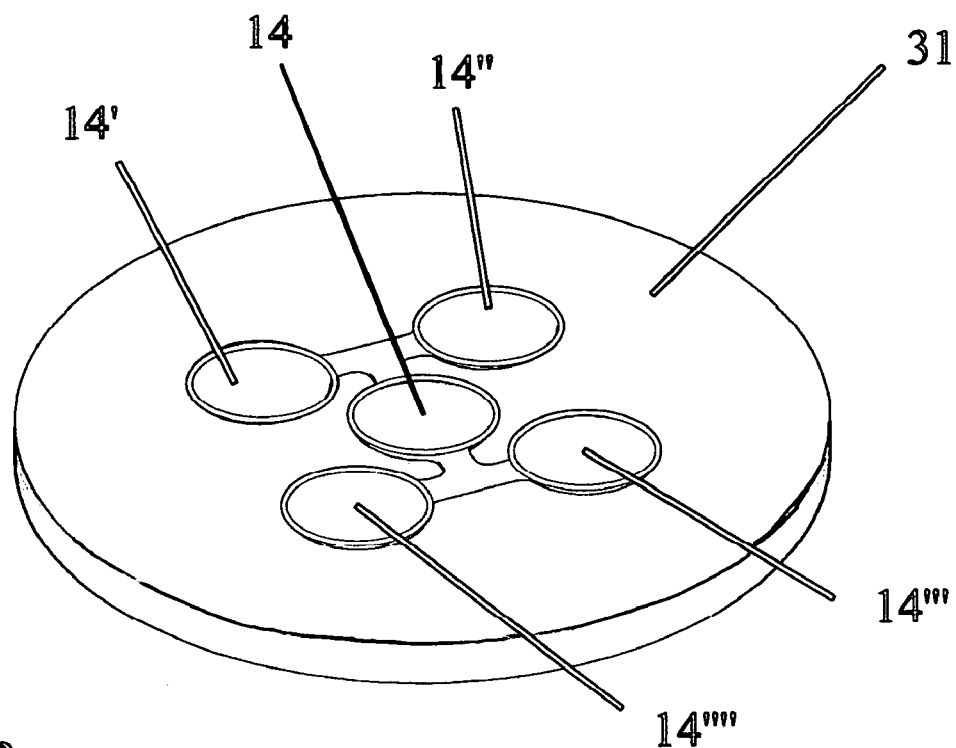
Figure 3D:
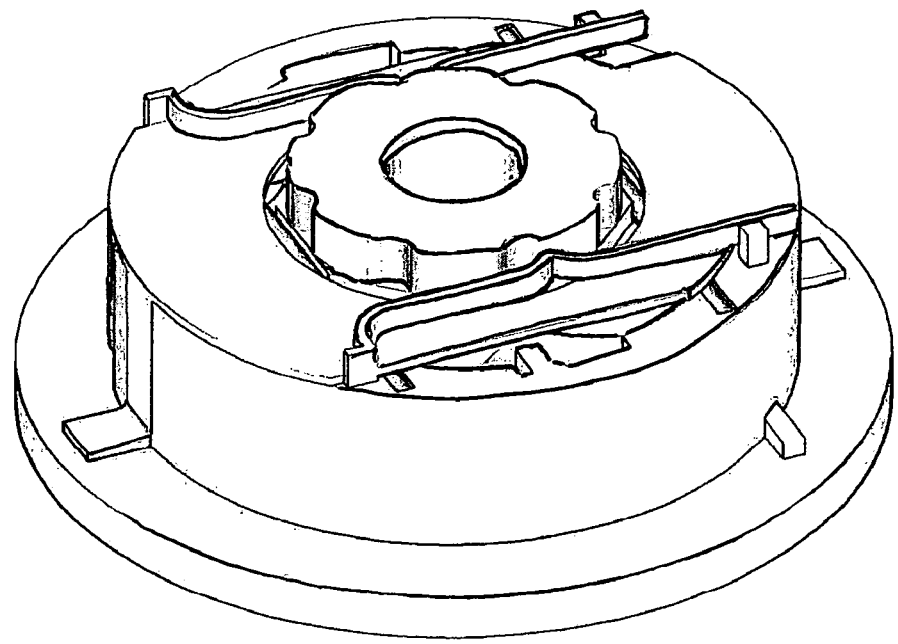

FIG. 2d is a sectional view through the rotatable multifunctional switch. A touch element 22 is fastened to the centre part 20. The central contact point 14 will be actuated by pressing on the centre of the touch element, indicated by the arrow 24. Pressing in one of the four directions, indicated by the arrows 25-25'' will bring about a tilting movement of the tilting device 1 which causes the associated projection of the cross member 8 in underlying position, as shown in FIG.

1a, to activate contact. A fourth action point is not visible in the figure, but can be seen more clearly in FIG. 4.

FIG. 3 shows a variant of the solution described above in connection with FIG. 2. The difference here is that contact points are located directly on a printed circuit board. A frame 30 will thus be capable of being mounted directly on the circuit board as shown in FIG. 3d. FIG. 3b shows clearly how the stepwise rotation is intended to be effected. In this figure two springs 32 and 32' are mounted, which springs rest against faces indicated by reference numeral 34. On rotation of the centre part 20, a stepwise movement will be obtained. Another aspect of the invention is that the cardan-like tilting device 1 can be made in a single piece with the frame part 8 in the embodiment shown in FIG. 3a. This may give production advantages, but may mean that the frame part and the tilting device are moulded in different materials.

Figure 4:
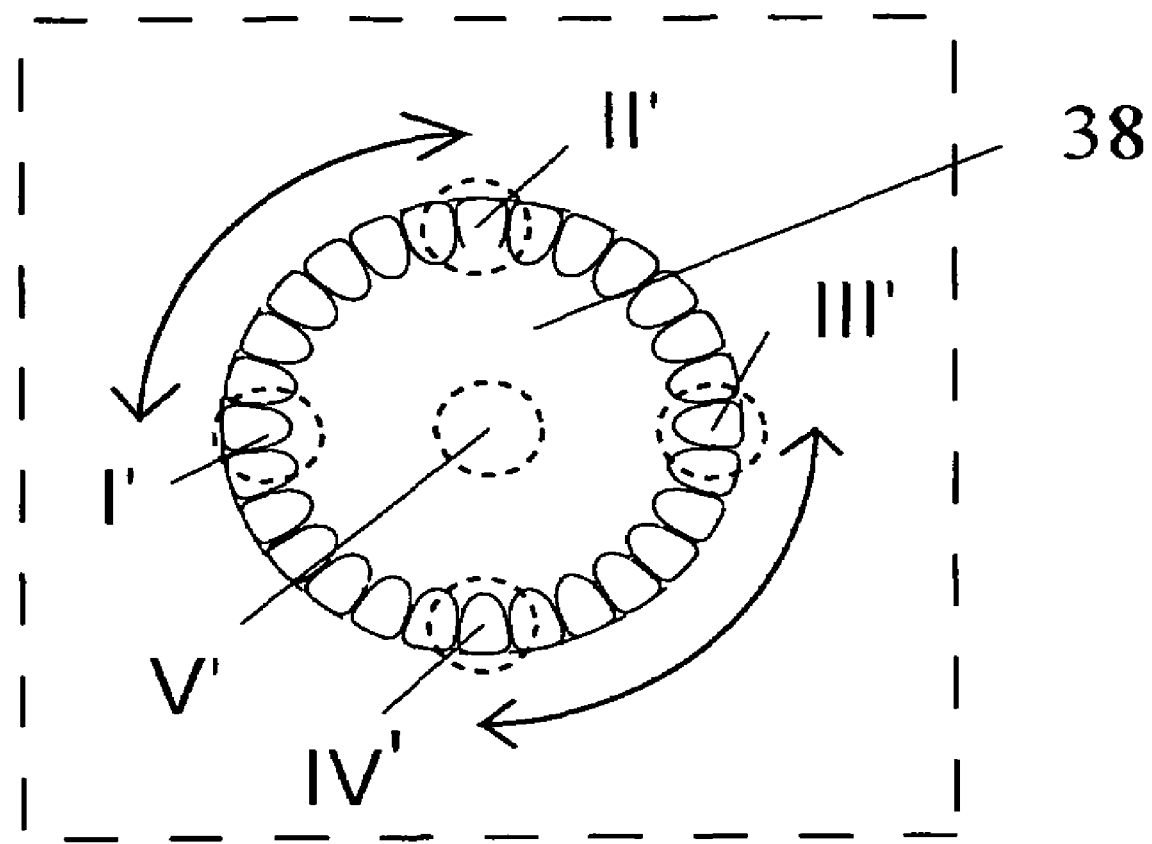
FIG. 4 shows the function of the operating element.

FIG. 4 shows a rotatable, tiltable and depressible multi-functional switch 38. This solution is used as an example of the tilting device according to FIGS. 2-3 and 5-9.

Figure 6A:
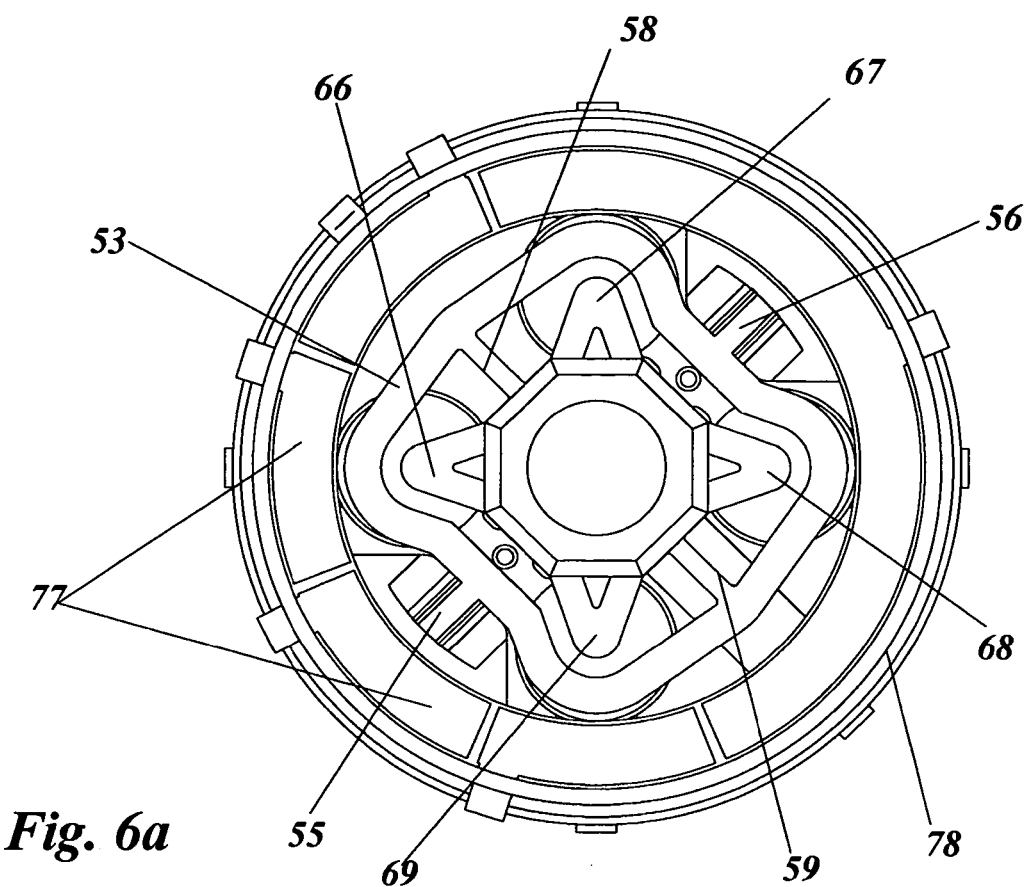
FIGS. 6a-6b show the switch when assembled, without the operating element.
Figure 6B:
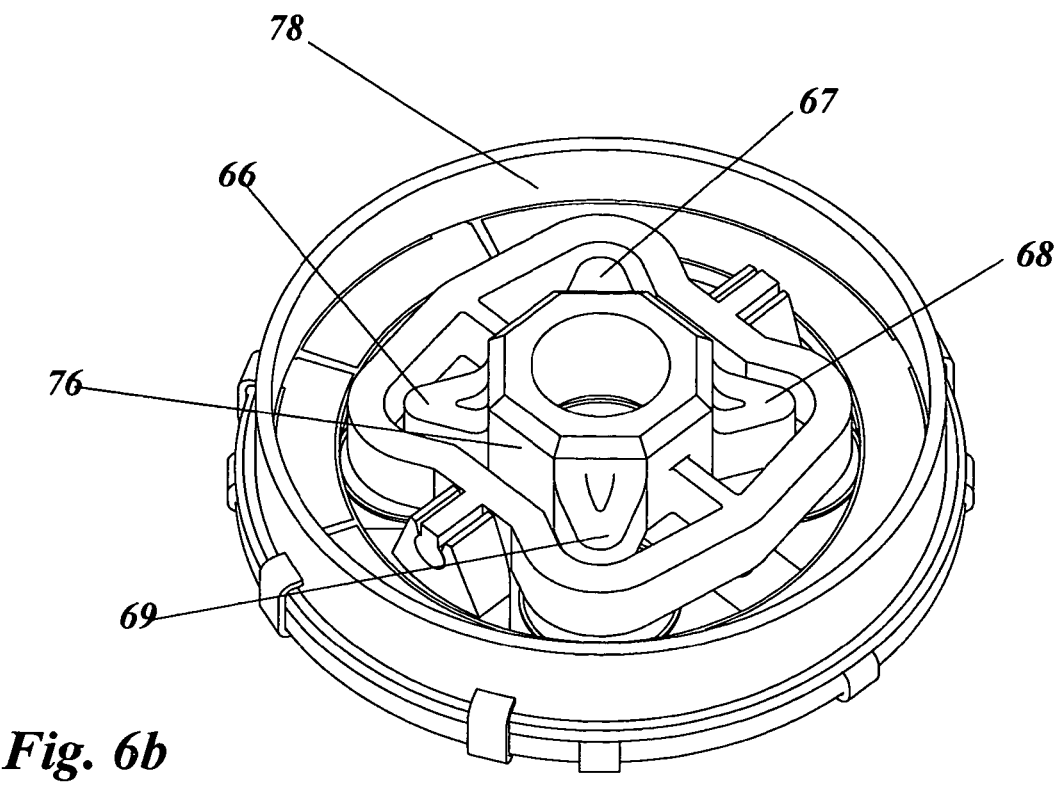

The following description and accompanying drawings show an alternative switch. FIG. 5 shows the individual parts of which the switch is comprised, whilst FIG. 6 is an enlarged illustration of the assembled switch without the upper operating member. A plate or base 50 has two rocker bearings 51-52 which form supporting points for a tilting device 53. The tilting device 53 is partly constructed like the solution shown in, for example, FIG. 1, and functions according to the principles illustrated and described therein, but unlike that solution, two shafts 55-56 that are fastened to an outer part 54 on each side of the tilting device 53 will provide a free, rotatable movement in the rocker bearing as opposed to the torsional effect provided by the previous solution. This results in a modified cardan coupling, as a cardan coupling generally has four rotatable bearings whilst the present cardan-like tilting device has two. The inner part of the tilting device 57 is fastened to the outer part via two "shaft" parts 58-59 which are offset 90° relative to the shafts 55-56. In production it will be possible to mould the whole tilting device 53 in one piece. The material used is flexible, for example, a suitable type of plastic. The shaft parts 58-59 have a thickness and a shape which mean that the inner part 57 can turn relative to the outer part 54. The base 50 has a signal handling section 60 to which snap discs 61-65 are attached above contact fields 71-75 and which together form switch contacts. The inner part of the tilting device is cruciform with four projections 66-69 (see FIGS. 6a-6b) arranged diagonally relative to the shafts and where the projections are arranged above the snap discs 62-65 (see FIG. 5). The switch has an operating member 80 which at the bottom of FIG. 5 is shown from the underside with associated parts. The operating member has a central shaft part 81 which passes through the tilting device. A spring 82 is secured in the operating member. The spring is in the form of a clip and grips about the centre portion 76 of the tilting device. This portion is circular and has a plurality of faces about which the spring grips. On rotation of the operating member, this will cause a stepwise movement. In this case, there are eight faces which provide corresponding steps, although this number should not be understood as limiting for the invention. A contact part in the form of a slip ring 84 is also fastened to the operating element. This ring has pins 85 and 86 that are in contact with a contact field 77 (see FIG. 6a) in a frame part 78. The contact field 77 is so divided that it registers rotation of the operating element through the slip ring. This is done in a way that will be familiar to the skilled person and is not-described in more detail here. The frame part 78 rests directly on the base part 50 of the switch and, as shown in FIG. 5, it can be fastened by using catches 90. The frame part is in contact with the signal handling section 60 for transmission of signals to and from the contact field 77 and the slip ring 84. FIGS. 6a-b show clearly the diagonal position of the projections of the tilting device with associated snap discs and contact fields in relation to the shafts of the tilting device. FIG. 6b shows clearly the faces of the centre part of the tilting device about which the spring of the operating member grips.

Figures 7A, 7B:
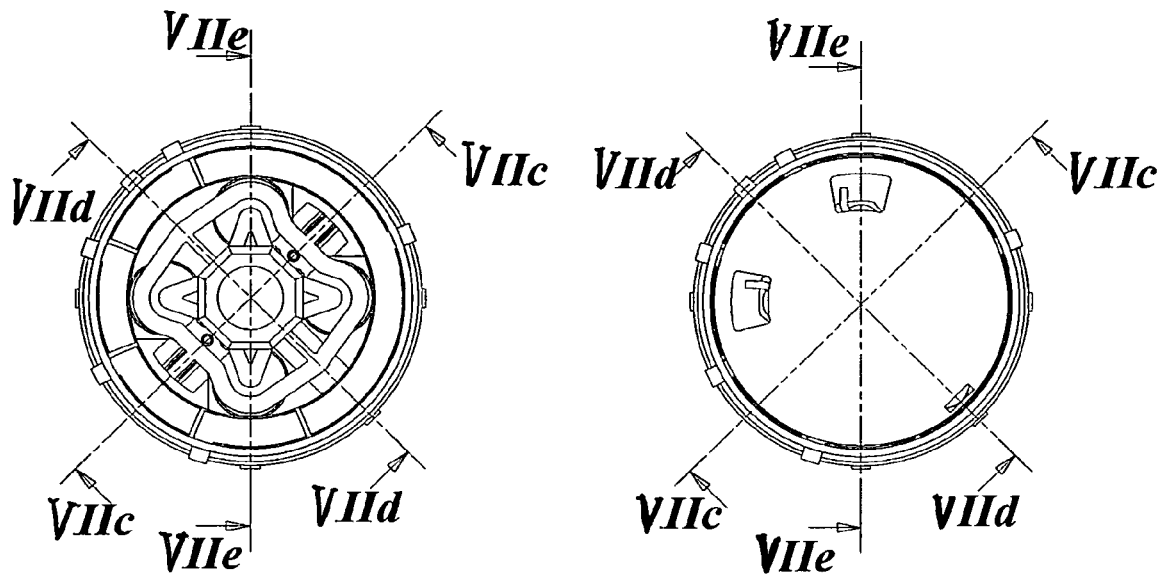
FIGS. 7a-7e show the switch when assembled, with the operating element, and sections thereof.
Figures 7C, 7D:
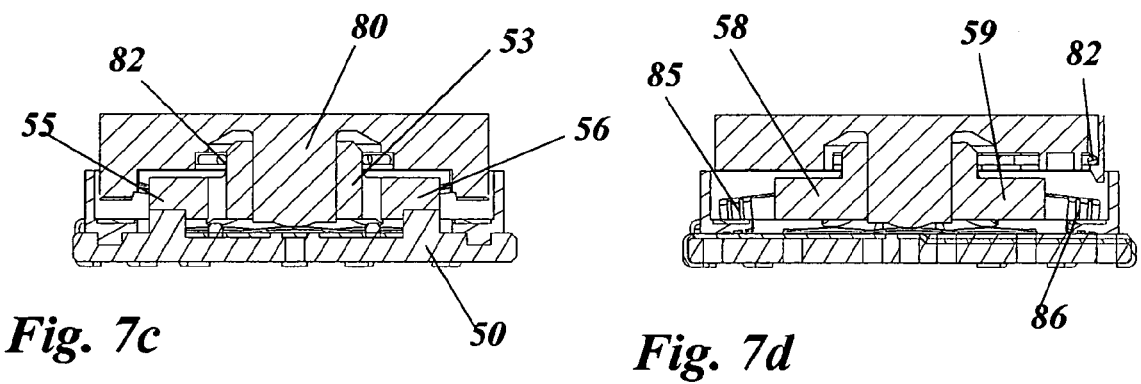
Figure 7E:
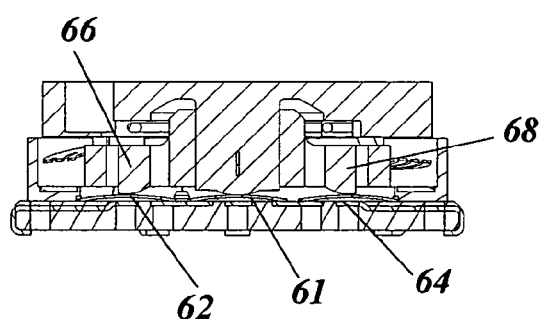

FIGS. 7c-e are sectional views through the switch which shows the details of the construction thereof for the further understanding of the invention, and where the sections VIIc-VIIc, VIId-VIId and VIIe-VIIe shown in FIGS. 7a and 7b refer to respective FIGS. 7c-7e.

The exterior of the operating element could have a surface mounted thereon which is user friendly with regard to the end product with which the switch device will be used.

The switch should be user-friendly to rotate, and should be designed so that the press and tilt function can be easily executed; see also FIG. 4.

Figure 8A:
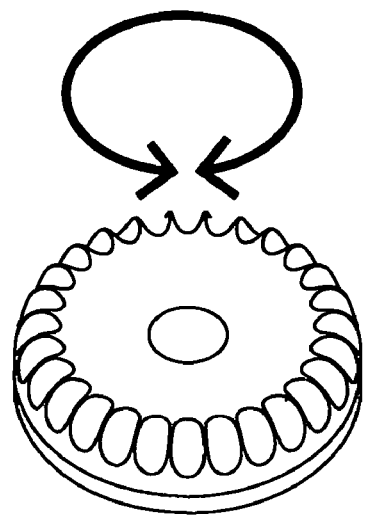
Figure 8B:
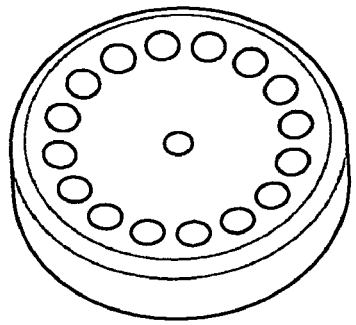
Figure 8C:
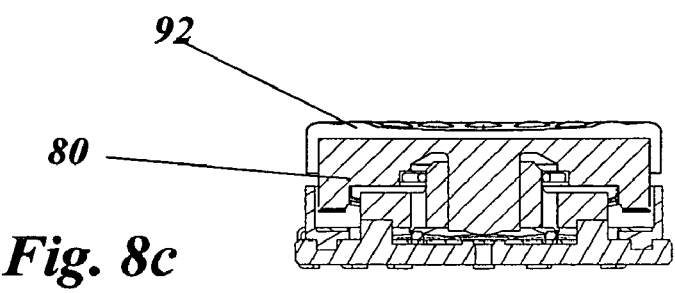

FIG. 8c shows a switch surface 92 mounted directly on the exterior of the operating member or the operating element 80. It will be understood that the operating element 80 may also be made so that the outer face is ready for use and does not need any outer casing. The surface will preferably have a design which provides friction for rotation of the operating element as indicated in FIGS. 8a-c.

Figure 8D:
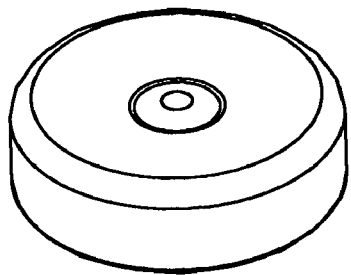

FIG. 8d has a smooth surface, but can nevertheless provide satisfactory user friendliness. The central position is slightly recessed, i.e., it has a concave shape, with a small projection for reliable function when the centre is pressed.

FIG. 9 shows a variant of the switch shown and described in connection with FIGS. 5-7, and which also must be understood in connection with what has been shown and described earlier, in connection with FIG. 1, for example. FIG. 9 shows the different parts used in the construction and the same references numerals as used in FIGS. 5-7 are used in this figure. However, here the contact fields 60 and 71-75 and the base plate or base 50 are shown both separately and in an assembled version. The snap discs (plate-shaped springs) 61-65 are mounted separately or are connected to each other as indicated by the reference numeral 94. This solution differs from the solution previously described in that the tilting device 53 is moulded in one piece with the frame 78, as shown in principle in connection with FIG. 1. Shafts 55 and 56 as shown in FIG. 5 have been replaced by flexible suspension arms 96 and 97 attached to the frame. This tilting part 98 (tilting device+frame) has an inlaid contact field 77 which the slip ring 84 will touch. The reference numeral 100 indicates the assembly of the parts where the upper side of the rotatable operating element is adapted for attachment of a user-friendly surface such as that shown in connection with FIG. 8.

The invention claimed is:

1. multifunctional switch device having tilt functions, for use in electronic equipment including computers, handheld electronic apparatus and transport devices including vehicles, boats and aircraft, said equipment having or being connected to a display for function control, the switch device having a central tilting device consisting of a housing which surrounds two mutually movable, cardan coupling-supported parts, a first of the parts mounted to the housing or to a base part of the device at a first pair of supporting points, and a second of the parts supported on the first part at a second pair of supporting points which are offset 90° relative to the first pair, characterised in that the switch device has underlying switch contact points and an underlying centre switch contact means and an operating member or element which is stepwise rotatable relative to the housing for cooperation with means for detecting a stepwise rotary position of the operating member, that the operating member is tiltable as well as downwardly pressable, that a second part of the tilting device has arms in a cross shape that are configured to actuate respective ones of the underlying switch contact points upon tilting of the operating element, and that the second part of the tilting device has a centre with a hole for slidably receiving a shaft located on the operating member, said member forming a rotatable, tiltable and depressible part of the switch device, said shaft operative as an actuator for the underlying centre switch contact means.

2. A multifunctional switch device as disclosed in claim 1, characterised in
that the housing, has a ring shape, as well as said first part and said second part are fixedly attached to each other to form a one-piece unit, the supporting points being flexible and torsional for mutual cardan movement.

3. A multifunctional switch device as disclosed in claim 1, characterised in
that the first and second mutually movable cardan supported coupling parts form a one piece unit that die first of the two mutually movable, cardan coupling-supported parts is mounted to a switch base at the first pair of supporting points; and that the second of said two mutually movable cardan supported coupling parts is supported on the first of said mutually moveable cardan supported coupling parts at the first second pair of supporting points which are offset 90° relative to the first pair of supporting points.

4. A multifunctional switch device as disclosed in claim 1, characterised in
that the mutually movable parts of the tilting device are made of a flexible material.

5. A multifunctional switch device as disclosed in claim 1, characterised in
that the two mutually movable parts of the tilting device are mounted on supporting points via shafts partly rotatable therein.

6. A multifunctional switch device as disclosed in claim 1, characterised in
that a centre portion of the tilting device: which forms a mount and rotary element for the rotatable shaft of the operating element, has a plurality of faces, against which at least one contact spring of the switch device rides in order to effect stepwise rotation of the operating element.

7. A multifunctional switch device as disclosed in claim 6, characterised in
that the stepwise rotation is detected by means of said at least one contact spring tilting on contact with grooves in the rotary element, and thereby forming contact with associated contact points arranged on the frame of the switch device.

8. A multifunctional switch as disclosed in claim 6, characterised in
said at least one contact spring being of a wire type and having a clip shape.

9. A multifunctional switch device as disclosed in claim 1, characterised in
that the first part of the tilting device is fixedly attached to the second part via the second pair of supporting points, which are flexible and torsional.

10. A multifunctional switch device as disclosed in claim 9, characterised in
that the first part of the tilting device has a pair of projecting tilt pins for pivotal engagement with the first pair of supporting points.

11. A multifunctional switch device as disclosed in claim 1, characterised in
that the first part of the tilting device has said first pair of supporting points fixedly attached to the base and a frame, and said first pair of the supporting points are flexible and torsional.

12. A multifunctional switch device as disclosed in claim 1, characterised in
that the rotatable operating member, which is pivotally supported in the tilting device, has mounted thereon an annular slip ring for sensing presence of contact fields located on a frame part of the device to detect a rotary position of the operating member in relation to the base of the device.

13. A multifunctional switch as disclosed in claim 12, characterised in
that said annular slip ring has two diagonally located points for attachment to the operating member and two diagonally located pins for contacting the contact fields.

14. A multi functional switch device as disclosed in claim 12, characterised in
that the base of the switch device has a plurality of snap discs and associated plurality of contact fields to provide for respective switch functions upon tilting or depression of the operating member; and that the base has mounted thereon an outer frame internally of which is located in a ring configuration a plurality of contact fields which contact points on die slip ring touch for detection of rotary position of the operating member relative to the device base.

15. A multifunctional switch device as disclosed in claim 1, characterised in
that central depression of the operating member and its shaft is designed to cause collapse of an underlying snap disc on a central contact field, whilst pressure on an outer part of the operating member or tilting of the operating member is designed to provide a movement of the tilting device which causes, through interaction with one of the arms on the tilting device, a collapse of one of a plurality of outer snap discs on an associated contact field underlying said arm.

16. A multifunctional switch device as disclosed in claim 1, characterised in
that the operating member has an outer face, or is encased by a part made having an outer face which is smooth or has contours, dimples or structures for friction against a user's finger in the peripheral area; and that the outer face is concave in a central part thereof and with a tactile pin or depression arranged in the centre.

17. A multifunctional switch device as disclosed in claim 1, characterised in
that the operating member is centrally depressible, stepwise rotable, as well as tiltable in four directions in order to actuate respective switch functions associated with such available movements of the switch device.

* * * * *